United States Patent [19]
Maeda

[11] Patent Number: 5,666,340
[45] Date of Patent: Sep. 9, 1997

[54] OPTICAL RECORDING MEDIUM INFORMATION REPRODUCING APPARATUS

[75] Inventor: Takanori Maeda, Tsurugashima, Japan

[73] Assignee: Pioneer Electronic Corporation, Tokyo, Japan

[21] Appl. No.: 581,382

[22] Filed: Dec. 29, 1995

[30] Foreign Application Priority Data

Jan. 6, 1995 [JP] Japan ................................ 7-000552

[51] Int. Cl.$^6$ ................................................ G11B 7/00
[52] U.S. Cl. ........................... 369/58; 369/54; 369/100; 369/109
[58] Field of Search ................................. 369/100, 109, 369/58, 47, 48, 110, 54, 53, 59

[56] References Cited

U.S. PATENT DOCUMENTS 5,355,361  10/1994  Maeda ................................. 369/58 X
5,430,704  7/1995  Maeda ................................. 369/109 X
5,463,608  10/1995  Higuchi ................................. 369/109

*Primary Examiner*—Muhammad N. Edun
*Attorney, Agent, or Firm*—Morgan, Lewis and Bockius, LLP

[57] ABSTRACT

An optical recording medium information reproducing apparatus comprises; an optical system irradiating a light beam onto an optical recording medium in such a manner that the formed light spot covering a plurality of mark regions such as a pit and a land formed on and along the track of the medium; a second optical system of image formation for forming real images for the mark regions and the track to make an image surface by receiving a reflected light from the light spot; photodetectors for detecting the real images with a plurality of light receiving areas arranged along the real images of the mark regions and the track; and a processing circuit for computing the output signal of the photodetecters at a signal representing a length of each mark region in the track direction. Therefore, an information signal recorded on the recording medium is exactly reproduced without any adverse influence due to variations of the time base caused by rotational variations or the like of the spindle motor.

13 Claims, 4 Drawing Sheets

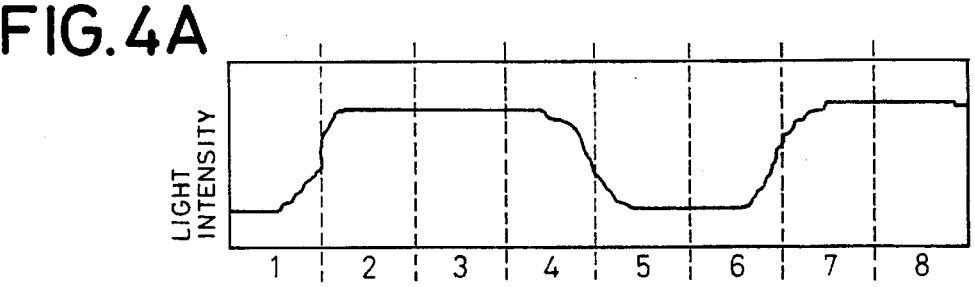
FIG.4A
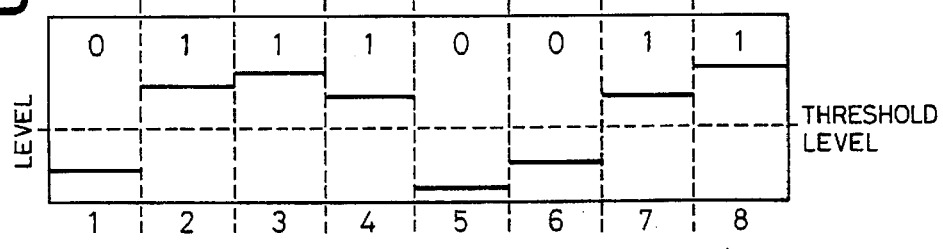
FIG.4B
FIG.4C
FIG.4D
FIG.4E

FIG.5A
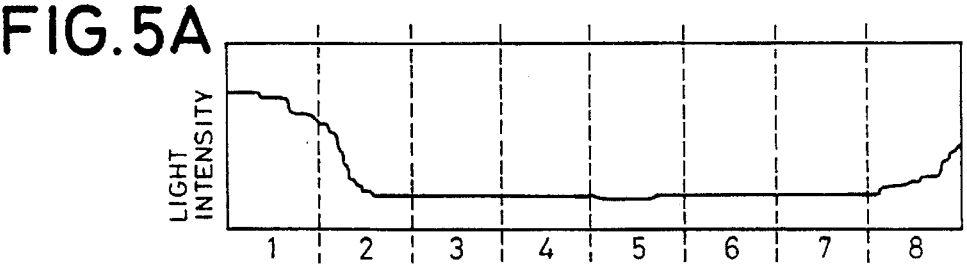
FIG.5B
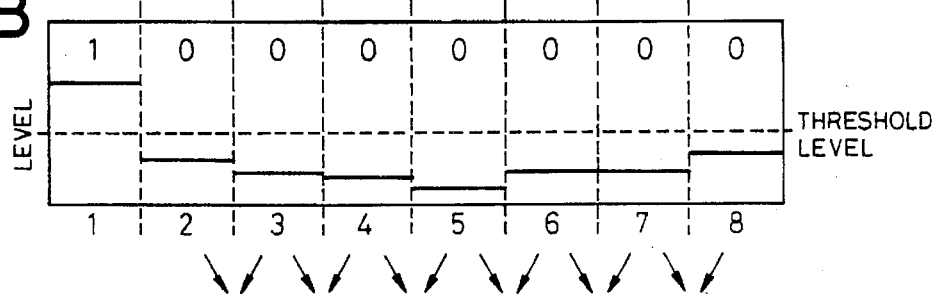
FIG.5C
FIG.5D
FIG.5E

OPTICAL RECORDING MEDIUM INFORMATION REPRODUCING APPARATUS

BACKGROUND OF THE INVENTION

1. Field of the Invention

The present invention relates to an information reproducing apparatus for reading and reproducing an information signal such as a video signal, an audio signal or the like recorded in an optical recording medium such as an optical disk, an optical card or the like.

2. Description of the Related Art

Conventional reproduction of a recorded signal from an optical disk is performed by an information reproducing apparatus in such a manner that a light beam is irradiated and converged onto the optical disk. A photodetector is placed at a non-image-formation point of the optical disk so as to receive a reflected light from the disk. The photo detector outputs a read-out signal corresponding to the total intensity of light. The signal is then processed such that it is binary-digitized in response to whether or not the signal level exceeds to a predetermined threshold level. Moreover, there is a regulation in a demodulation for a digital signal recorded on an optical disk such that a pit length formed on the optical disk is defined to be integer-fold of a reference pit length. By this, since a time-interval exceeding to the threshold level and the read-out signal is integer-fold of the reference clock period, the judgement can be performed what pit length corresponds to the reproduced read-out signal in the information reproducing apparatus.

It is required that the optical disk should be stably rotated in the conventional information reproducing apparatus, since the read-out signal is processed in response to a change-of-time of a voltage output. However, it has been recognized that the read-out signal is generally influenced by rotational variations of the optical disk which cause a jitter of instability in the time base of the signal, since the spindle motor commonly used in the apparatus gives rotational variations to the driven disk. It is therefore required that reference time interval (clock period) for the signal to be recorded is defined to be longer than the jitter duration. However, the long clock period is an obstacle to record information at a high density onto the optical disk.

Particularly, when a video signal recorded on the recording medium is reproduced, it is convenient to vary the amount of data of the video signal according to the content of a picture to be displayed on a screen. It is conjectured that the rotation speed of the optical disk is changed in response to the required amount of data. In this case, it is difficult to change and stabilize the clock period or the rotation speed in a short period. Further, it is necessary to use mean for time-conversion requiring a large amount of memory.

SUMMARY OF THE INVENTION

Accordingly, the present invention has been made to solve such a problem in view of the forgoing status. An object of the invention is to provide an optical recording medium information reproducing apparatus capable of correctly reproducing a recorded information signal from the optical disk without any adverse influence due to variations of the time base caused by rotational variations or the like of the spindle motor.

An optical recording medium information reproducing apparatus according to the present invention for reproducing an information signal from a recording medium in which the information signal is recorded as a change-of-length in a track or tangential direction of a pair of mark regions optically different from each other, which comprises:

an irradiation optical system with a light source generating a light beam for irradiating the light beam onto mark regions in at least one track of the recording medium as a light spot covering a range longer than the largest length of the mark regions;

image formation means of forming a real image for said mark regions and the track to make an image surface by receiving a reflected light from said light spot;

photodetection means for detecting the reflected light with a plurality of light receiving areas arranged along said mark regions and said track in the image surface each of which generates an output signal in response to the amount of light received; and processing means for computing an output signal of said photodetection means at a signal representing a length of each mark region in the track direction.

In the present invention of the optical recording medium information reproducing apparatus, the optical recording medium carries mark regions such as a pit and a land or the like which are optically different from each other and formed on and along the track thereof whose change-of-length in a track direction represents the recorded information. While covering a plurality of pits and lands with an irradiated light beam spot, by using the reflected light a real track image is projected over a plurality of light receiving areas of the photodetection means. Thus, the signal representing a length of each mark region in the track direction is produced by the photodetection means for computing the output signal from the photodetection means.

BRIEF DESCRIPTION OF THE DRAWINGS

FIGS. 4A to 4E are schematic diagrams each illustrating an example operation of the circuit shown in FIG. 3; and FIGS. 5A to 5E are schematic diagrams each illustrating another example operation of the circuit shown in FIG. 3.

DETAILED DESCRIPTION OF THE PREFERRED EMBODIMENTS

The preferred embodiments according to the present invention will be described in detail with reference to the accompanying drawings.

Figure 1:
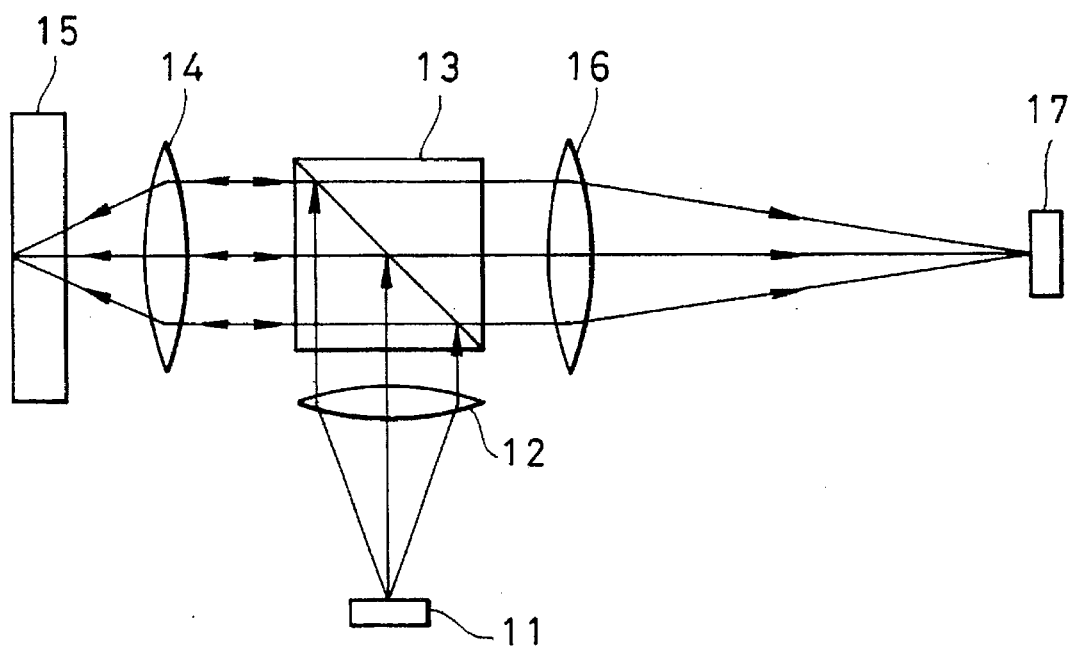
FIG. 1 is a schematic diagram of a photodetection optic system used in an optical disk player according to the present invention.

FIG. 1 shows an optical system of an optical disk player to which the present invention is applied. In FIG. 1, a laser light beam projected from a light source 11 is converted by a collimator lens 12 into a parallel light beam. The parallel light beam is reflected by a beam splitter 13 to an objective lens 14 which irradiates onto an optical disk 15 as a light spot covering a range longer than the largest length of the mark regions of pits. Namely, the objective lens 14 makes an elliptical spot of light in the track of pits of the optical disk. The optical disk 15 carries a pit row in the track corresponding to an information signal to be reproduced. The reflected light from the optical disk 15 becomes a parallel light beam after passing through the objective lens 14, and then goes through the beam splitter 13 to an image-formation lens 16. This image formation optical system forms a real image of the pits and the track to make an image surface by receiving a reflected light from the light spot. Namely, the combination of the image-formation lens and the objective lens 14 makes the image-formation at a transverse magnification b as a real pit image. At the position of the image-formation a photodetector 17 is disposed and detects the pit image. The photodetector 17 has a plurality of light receiving areas arranged in the track direction of the formed real image of the pits and the track as will be described below. In practice, even if the optical elements are arranged so as to be twisted with each other in the optical system, the image-formation is performed on the plural light receiving areas row in the track direction. The track direction implies a direction the track extends.

The light source 11 emits light at a longitudinal far field which is a broad area type semiconductor laser. The light source is disposed in such a manner that its longitudinal far field pattern coincides with a pit length direction (a track direction).

Figure 2:
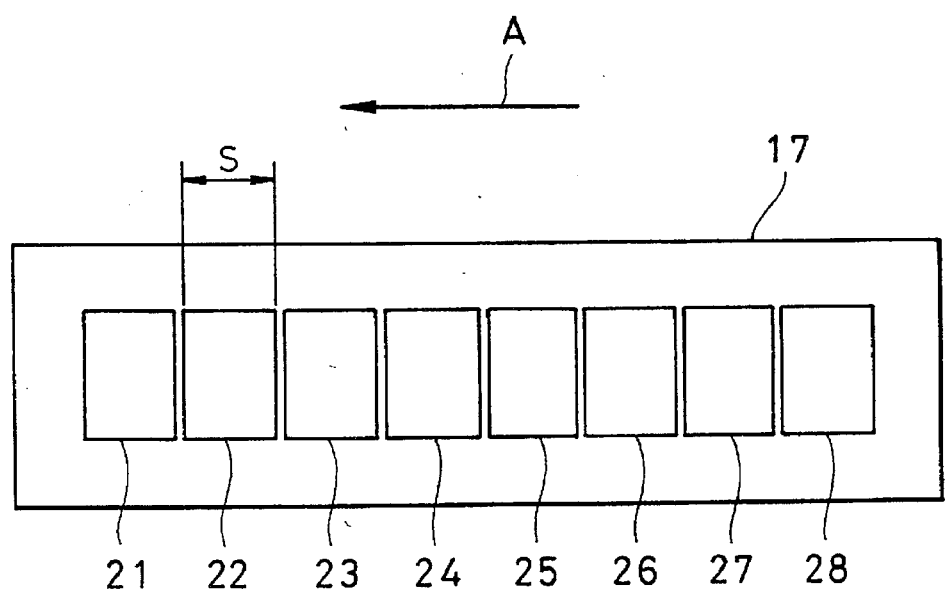
FIG. 2 is a plan view of a light-receiving portion of the photodetector shown in FIG. 1.

FIG. 2 shows the photodetector 17 disposed at the image-formation surface of the pit image. The photodetectors are disposed at an image formation position conjugate to pits on the optical disk with respect to the objective lens 14 and the image-formation lens 16. The arrow A shown in FIG. 2 represents the rotation direction of the optical disk. The photodetector 17 includes optical receiving elements 21 to 28 each having light receiving areas of the same size and arranged in the real track image. The width s in the direction corresponding to the track direction arrow A of each optical receiving element is defined by the following equation, $$s = t \times b$$

wherein t represents a reference pit length on the optical disk, and b represents a transverse magnification of the optic system including the image-formation lens 12 making the real pit image on the photodetector 17 under the condition that b is greater than or equal to 1.

The practical pit length is set at an integer-fold of t such as 2t, 3t, 4t, 5t, 6t, 7t or more. Similarly, the land length between a pair of adjacent pits is set at an integer-fold of t such as 2t, 3t, 4t, 5t, 6t, 7t or more. For example, when the pit length is set within 7t then the light spot from the light source 11 is formed on the optical disk 15 so as to be 8t longer than the largest pit length of 7t, so that the photodetector 17 detects the real pit images.

Figure 3:
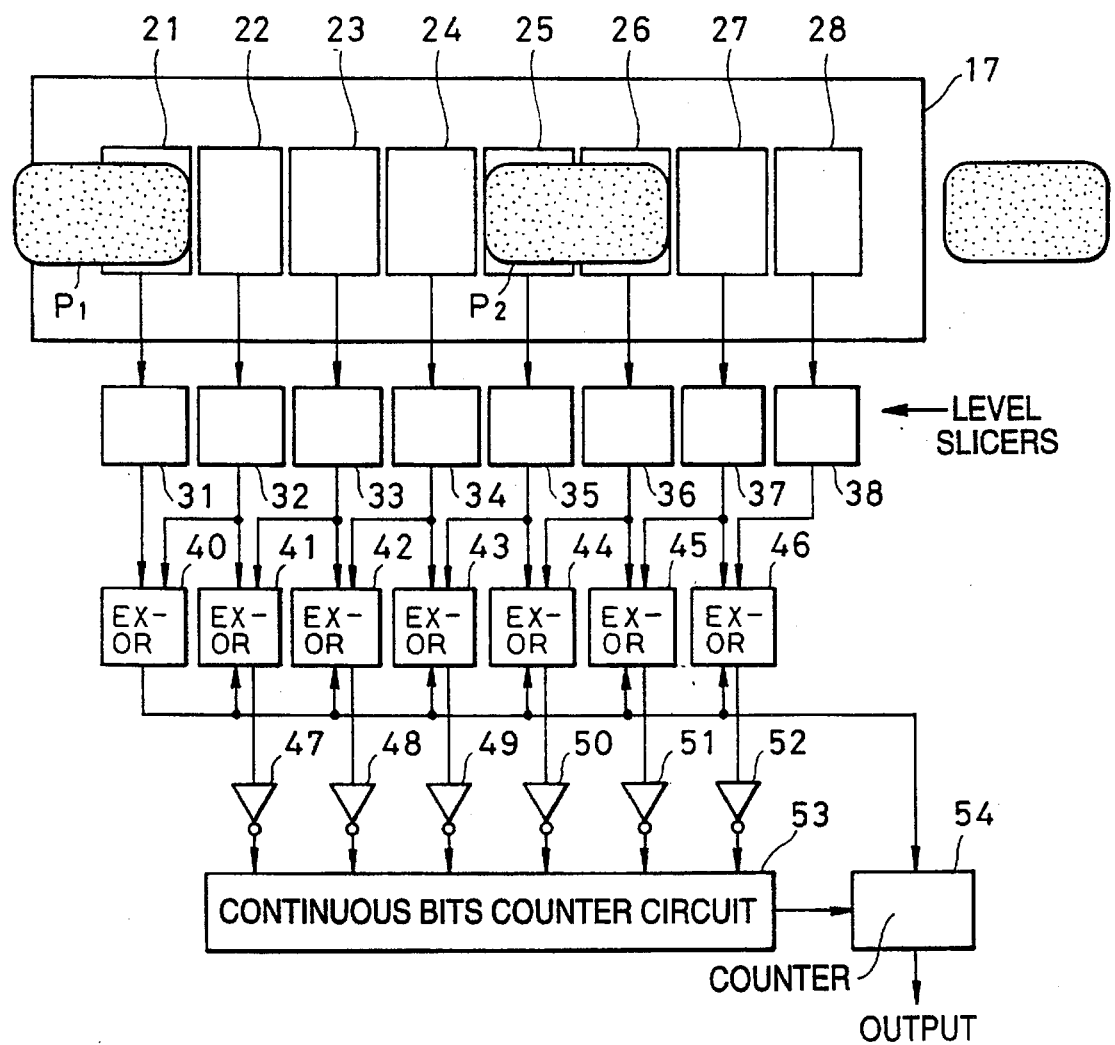
FIG. 3 is a schematic block diagram of a processing circuit for computing an output signal of the photodetector.

FIG. 3 shows a schematic block diagram of a processing circuit for computing an output signal of the photodetector 17. The processing circuit is electrically connected to the photodetector 17 so that outputs terminals of optical receiving elements 21 to 28 are connected to level slicers 31 to 38 respectively. The level slicers 31 to 38 binary-digitize the corresponding output signals of the optical receiving elements 21 to 28 with respect to a predetermined threshold level respectively. A pair of adjacent level slicers 31 to 38 are electrically connected in turn to EX-OR (Exclusive-OR) circuits 40 to 46. Namely, the level slicers 31, 32 are connected to the EX-OR circuit 40, the level slicers 32, 33 are connected to the EX-OR circuit 41, the level slicers 33, 34 are the EX-OR circuit 42, the level slicers 34, 35 are connected to the EX-OR circuit 43, the level slicers 35, 36 are connected to the EX-OR circuit 44, the level slicers 36, 37 are connected to the EX-OR circuit 45, and the level slicers 37, 38 are connected to the EX-OR circuit 46. The output terminals of the EX-OR circuit 40 are electrically connected to the EX-OR circuits 40 to 46 and a counter 54. The EX-OR circuit 40 outputs a high level signal when levels of the output signals of the level slicer 31, 32 are different from each other. The EX-OR circuits 41 to 46 are electrically connected to inverters 47 to 52 respectively. When the output signal of the EX-OR circuit 40 is a high level, then the EX-OR circuits 41 to 46 generate outputs of Exclusive-OR in response to elevation of signal occurring.

The output signals of the EX-OR circuits 41 to 46 are inverted by the inverters 47 to 52 respectively. The inverters 47 to 52 are electrically connected to a continuous-bits-counter circuit 53. The continuous-bits-counter circuit 53 counts continuous bits from MSB of outputs from the inverters 47 to 52 to output the counted value to the counter 54. The counter 54 is reset in response to an output signal of the EX-OR circuit 40.

There will be described the operation of the processing circuit in the case that a land with a length 3t exists at the reading position on the optical disk 15. As seen from FIG. 3, the bright 3t length land is in between real images of dark pit P1 and P2 on the photodetector 17. The head of the land travels on the photodetector 17 with the rotation of the optical disk 15. FIG. 4A shows a light intensity distribution on the light receiving areas in the optical receiving elements 21 to 28 when the head of the land exists at the boundary between the light receiving areas of the optical receiving elements 21, 22. The numeral references of 1, 2, 3, ..., and 8 corresponds to the optical receiving elements 21 to 28. Since the width s of each light receiving area is represented by t×b, each light receiving area receives light for the 1 bit information. Therefore, output signal levels of the optical receiving elements 21 to 28 corresponds to levels of the light intensity distribution respectively. As seen from FIG. 4B, the output signals of the optical receiving elements 21 to 28 are binary-digitized by the corresponding level slicers 31 to 38 respectively, so that the output values of the level slicers 31 to 38 are represented by the logic value "01110011" of 8 bits as a bit string signal in that the output of the level slicer 31 is MSB.

In this case, the output level of the EX-OR circuit 40 is a high level representing the logic value "1". This high level output is provided to the EX-OR circuits 41 to 46 and the counter 54 as a gate pulse. Therefore, as seen from FIG. 4C the output values of the EX-OR circuits 41 to 46 becomes the logic value "001010" of 6 bits as a bit string signal in that the output of the EX-OR circuit 41 is MSB. As seen from FIG. 4D, the output values of the EX-OR circuits 41 to 46 are inverted by the inverters 47 to 52 respectively, so that the output values become the logic value "110101". The continuous-bits-counter circuit 53 converts only continuous bits starting from the MSB into continuous bits regarding as continuous "1". The bits "01" or "10" are converted into "00". In this case as seen from FIG. 4E, the continuous-bits-counter circuit 53 converts the output "110101" of the inverters into the logic value "110000" because including 2 bits "11" starting from MSB. The output value of the continuous-bits-counter circuit 53 is obtained as a decimal count "2" to be provided to the counter 54. After being reset by the elevating output of the EX-OR circuit 40, the counter 54 performs an operation represented by 2+1=3. As a result, the output of the counter 54 represents a value corresponding to 3t as a detected value which shows a land length after a transition from a pit to a land, or a pit length after a transition from a land to a pit.

FIG. 5A shows a light intensity distribution on the light receiving areas in the optical receiving elements similar to FIG. 4A but a 7t length pit is detected. FIG. 5B to 5E show the output signals of the corresponding means. FIG. 5A shows the light intensity distribution on the light receiving areas in the optical receiving elements 21 to 28 when the head of the 7t length pit exists at the boundary between the light receiving areas of the optical receiving elements 21, 22. As seen from FIG. 5B, the output signals of the optical receiving elements 21 to 28 are binary-digitized by the corresponding level slicers 31 to 38 respectively, so that the output values of the level slicers 31 to 38 are represented by the logic value "10000000" of 8 bits as a bit string signal in that the output of the level slicer 31 is MSB. In this case, FIG. 5C shows the logic value "000000" output from the EX-OR circuit 41 to 46 in response to the high level provided from the EX-OR circuit 40 representing the logic value "1". As seen from FIG. 5D, the output values of the EX-OR circuits 41 to 46 are inverted by the inverters 47 to 52 respectively, so that the output values become the logic value "111111". As seen from FIG. 5E, the continuous-bits-counter circuit 53 converts the output "111111" of the inverters into the logic value "111111" to provide it to the counter 54. After being reset, the counter 54 performs an operation represented by 6+1=7. As a result, the output of the counter 54 represents a value corresponding to 7t as a detected value which shows a pit length after a transition from a land to a pit.

In adaption to the embodiment mentioned above in that the timing for detecting a pit or land in the optical disk is set when the head of the land image or pit image exists at the boundary between the light receiving areas of the optical receiving elements 21, 22, the timing for detecting may be set when the head of the land image or pit image exists at the boundary between the light receiving areas of the optical receiving elements 27, 28.

Furthermore, there is constructed a pair of light receiving areas of optical receiving elements consisting of forward and backward portions in which the output difference between the outputs of the forward and backward elements is detected and then it is determined whether or not the difference is zero "0". In this case, there may be utilized a means for detecting whether or not a pit image is at a predetermined position, so that various developments are obtained by the invention. When forward and backward portions are separated from a single optical receiving element and the output difference therebetween is detected, the setting of a unit length of a light receiving area to a half of a predetermined length of a real image may achieve the detection of length of an odd number-fold of the unit length.

Moreover, in adaption to the embodiment mentioned above in that the output signals of the photodetectors are binary-digitized and classified, an output signal of the photodetector may be used as an analog signal data which represents a pit length as an indicator. Alternatively, an output signal of the photodetector may be quantized to a multi-value such as triplet or quadruple value or more.

In adaption to the embodiment mentioned above where the processing circuit is constructed so as to output a single pit or land length, without restriction by this, the processing circuit may be constructed so as to detect a group consisting of a plurality of pits or lands. For example, the information signal may be previously encoded in such a manner that there exists a relationship between the reproduced signal obtained by computing a result from the output signals of the photodetectors and the recording signal at the time it has been recorded on the optical disk, so that various developments are obtained by the invention together with the encoding system for encoding the signal.

Although the embodiment mentioned above utilizes a length of 2 to 7 -fold of the reference length with respect to a pit or land length, without restriction by this, the reference length may be used as it is.

Moreover, in adaption to the embodiment mentioned above where the output signals of the photodetectors are input into the level slicers to be binary-digitized, there may be provided a system for accepting a cross-talk between adjacent tracks. In this case, the invention further comprises means for computing that removes the cross-talk component from the output signals of the photodetectors, and then provides the cleaned output signals to the level slicers to be continued to the same processing above mentioned.

Although the embodiment mentioned above comprises a structure for detecting an recorded signal from an optical disk having pits, the optical disk and optical system of the invention are not limited by this structure. Another embodiment may comprise a structure for detecting a recorded signal from a phase-change type recording medium used for an optical disk or magneto-optical type optical disk using the Karr effect and the separation of polarization in the optical system, so that various developments are obtained.

Although the embodiment mentioned above comprises a structure for detecting the recorded signal per one track from the optical disk having pits, the optical disk and optical system of the invention are not limited by this structure. Another embodiment may comprise a structure for reading and detecting a recorded signal from a plurality of tracks at the same time. In this case, the embodiment may include means for removing the cross-talk from the detected signals. Moreover, Another embodiment may comprise a structure in that each light receiving area in the photodetector is further separated into small segments for avoiding the phase shift in the adjacent tracks, and alternatively comprises means for digital/analog processing the detected signals and means for performing the demodulation of the signal, so that it is possible to obtain the same read-out process as the reading process of preforming it per one track above mentioned.

Furthermore, the optical system for the present invention is not restricted by that shown in FIG. 1. One lens may be partly omitted. Instead of the laser, an LED may be used for the light source. The recording medium image may be directly projected onto the light receiving areas of the photodetector without using the lens, so that a recording medium image is required on the light receiving areas, e.g., the photodetector may be abutted onto recording medium so that the recording medium image is directly image-formed on the light receiving areas of the photodetector. Moreover, another embodiment can include a semiconductor laser of a point light source type and a cylindrical lens so as to provide an astigmatic beam for irradiating it on predetermined length pits or lands in the recording medium in such a manner that the formed point light source image is expanded on the medium.

Subsequently, although a focusing mechanism and a tracking mechanism are omitted in FIG. 1, these mechanisms are provided in the present invention.

In addition to the embodiment mentioned above where an optical disk is used for an optical recording medium, an optical card or the like may be used for the optical recording medium. This invention is adapted to another reproducing device reproducing an information signal from the optical card or the like. Although the pit and land are used for an information signal, another mark or the like may be used and formed in a track formed on the recording medium instead of the pit and land.

According to the optical recording medium information reproducing apparatus of the present invention, the apparatus comprises; an optical system irradiating a light beam onto an optical recording medium in such a manner that the formed light spot covering a plurality of mark regions such as a pit and a land formed on and along the track of the medium; a second optical system of image formation for forming real images for the mark regions and the track to make an image surface by receiving a reflected light from the light spot; photodetecters for detecting the real images with a plurality of light receiving areas arranged along the real images of the mark regions and the track; and a processing circuit for computing the output signal of the photodetecters at a signal representing a length of each mark region in the track direction. Therefore, an information signal recorded on the recording medium is exactly reproduced without any adverse influence due to variations of the time base caused by rotational variations or the like of the spindle motor. By this, a unit recording length of the pit is decreased by the amount of the reduced jitter, so that the total amounts of recordable information signals increase. Furthermore, the invention provides an advantageous effect in that it facilitates reproduction of an information signal, even when the amounts of data of the video signal are changed according to the content of picture to be displayed on a screen, e.g., the rotation speed of an optical disk is changed.

What is claimed is:

1. An optical recording medium information reproducing apparatus for reproducing an information signal recorded on a recording medium wherein the information signal is recorded as a change-of-length in a track direction of mark regions optically different from each other, a single sequence of the mark regions extending in the track direction on the recording medium comprising:

an irradiation optical system having a light source generating a light beam and irradiating the light beam onto mark regions moving in the track direction on the recording medium as a light spot covering a range longer than the largest length of the mark regions;

image formation means for forming a real image of the mark regions to make an image surface by receiving a reflected light from the light spot;

photodetection means for detecting the reflected light having a plurality of light receiving areas arranged in a direction corresponding to the track direction in the real image of the mark regions on the image surface, each of the light receiving areas generating an output signal in response to an amount of light detected; and processing means for processing the output signals of the photodetection means to produce a signal representing a length of each mark region in the track direction.

2. An optical recording medium information reproducing apparatus set forth in claim 1, wherein the image formation means includes an image-formation lens and optical receiving elements as the light receiving areas each having the width s in a direction of a real image corresponding to the track direction by the following equation, $$s = t \times b$$

wherein t represents a reference pit length on the optical disk, and b represents a transverse magnification of the optic system including the image-formation lens making the real pit image on the optical receiving elements under the condition that b is greater than or equal to 1.

3. An optical recording medium information reproducing apparatus set forth in claim 2, wherein said width of each of the light receiving area is equal to a half of the reference pit length.

4. An information reproducing apparatus for reproducing information recorded on an optical recording medium, wherein the information is represented as a distance in a track direction between a pair of mark regions that are optically different from each other, comprising:

a light source emitting light;

an optical system concentrating the emitted light onto mark regions in at least one track of the recording medium wherein the concentrated light covers a range longer than the largest length between adjacent mark regions;

a plurality of light detectors for detecting light reflected from the recording medium, each light detector producing a detection signal corresponding to an intensity of the light detected; and an electronic circuit for processing the signals produced by the light detectors to produce an output signal representing a length between adjacent mark regions in the track direction.

5. An optical recording medium information reproducing apparatus set forth in claim 4, wherein the electronic circuit comprises a plurality of pairs of level slicers for digitizing the detection signals with respect to a predetermined threshold level.

6. An optical recording medium information reproducing apparatus set forth in claim 5, wherein the electronic circuit further comprises a plurality of exclusive-or (EX-OR) circuits, a plurality of inverters, and a continuous-bits-counter circuit; each input of the EX-OR circuits being connected to one of the plurality of pairs of level slicers, and each output of the EX-OR circuits being connected to an input of one of the plurality of inverters, and each output of the inverters being connected to the continuous-bits-counter circuit.

7. An optical recording medium information reproducing apparatus set forth in claim 5, further comprising a second circuit for removing a cross-talk component from the detection signals prior to the detection signals being supplied to the level slicers.

8. An optical recording medium information reproducing apparatus set forth in claim 4, wherein the electronic circuit produces an output signal corresponding to a single pit or land length.

9. An optical recording medium information reproducing apparatus set forth in claim 4, wherein the electronic circuit produces an output signal corresponding to a group consisting of a plurality of pits or lands.

10. An optical recording medium information reproducing apparatus set forth in claim 4, wherein each light detecting device is separated into segments for avoiding a phase shift in adjacent tracks.

11. An optical recording medium information reproducing apparatus set forth in claim 4, wherein the light source comprises a light emitting diode (LED).

12. An optical recording medium information reproducing apparatus set forth in claim 4, wherein the light source comprises a semiconductor laser.

13. A method for reproducing information recorded on a recording medium in which the information is represented as a distance in a track direction between a pair of mark regions that are optically different from each other, comprising the steps of:

concentrating a light beam onto the mark regions in at least one track of the recording medium to produce a light spot covering a range longer than the length of the mark regions;

detecting light reflected from the recording medium with a plurality of light receiving devices;

generating a plurality of detection signals corresponding to the amount of light detected at each of the plurality of light receiving devices; and processing the plurality detection signals to produce an output signal representing a length between adjacent mark regions in the track direction.

* * * * *